(12) United States Patent
Nuggehalli et al.

(10) Patent No.: US 9,134,882 B2
(45) Date of Patent: *Sep. 15, 2015

(54) METHODS AND APPARATUS FOR PRESENTATION OF SOFTWARE AS A SERVICE APPLICATIONS

(71) Applicants: Jayasimha Nuggehalli, Cupertino, CA (US); Jiang Hong, San Jose, CA (US); Zhenyu Lu, Sunnyvale, CA (US); Guiluan Luo, Pleasanton, CA (US); Revathi Vulugundam, San Jose, CA (US)

(72) Inventors: Jayasimha Nuggehalli, Cupertino, CA (US); Jiang Hong, San Jose, CA (US); Zhenyu Lu, Sunnyvale, CA (US); Guiluan Luo, Pleasanton, CA (US); Revathi Vulugundam, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,230

(22) Filed: Aug. 26, 2013

(65) Prior Publication Data
US 2014/0040757 A1 Feb. 6, 2014

Related U.S. Application Data

(63) Continuation of application No. 12/817,051, filed on Jun. 16, 2010, now Pat. No. 8,521,777.

(51) Int. Cl.
*G06F 3/0482* (2013.01)
*H04N 1/00* (2006.01)

(52) U.S. Cl.
CPC .......... *G06F 3/0482* (2013.01); *H04N 1/00244* (2013.01); *H04N 1/00474* (2013.01); *H04N 1/00464* (2013.01); *H04N 1/00514* (2013.01); *H04N 2201/001* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2006/0112182 A1* | 5/2006 | Chen et al. | 709/229 |
| 2009/0037287 A1* | 2/2009 | Baitalmal et al. | 705/26 |
| 2009/0125796 A1* | 5/2009 | Day et al. | 715/219 |
| 2009/0187654 A1* | 7/2009 | Raja et al. | 709/224 |
| 2009/0241104 A1* | 9/2009 | Amiga et al. | 717/174 |
| 2009/0276771 A1* | 11/2009 | Nickolov et al. | 717/177 |
| 2011/0093366 A1 | 4/2011 | Nuggehalli | |

OTHER PUBLICATIONS

Dell Latitude D400 2004, Dell Inc, http://www.dell.com/downloads/us/products/latit/d400_spec.pdf.*

* cited by examiner

*Primary Examiner* — Jason Liao
(74) *Attorney, Agent, or Firm* — Duft Bornsen & Fettig LLP

(57) ABSTRACT

Methods and apparatus are disclosed for flexible presentation of Software As A Service (SAAS) applications to one or more client devices such as multi-function devices (e.g., MFPs). A management system receives presentation layout information for subscribed SAAS applications from users and administrators, generates a menu of subscribed SAAS applications for presentation to a user on a display of the client device, and transmits the menu to a client device for presentation to the user on a display of the client device. The management system may also provide for user/administrator customization of the menu of applications available to users, and for revocation of applications by an administrator of the management system.

11 Claims, 9 Drawing Sheets

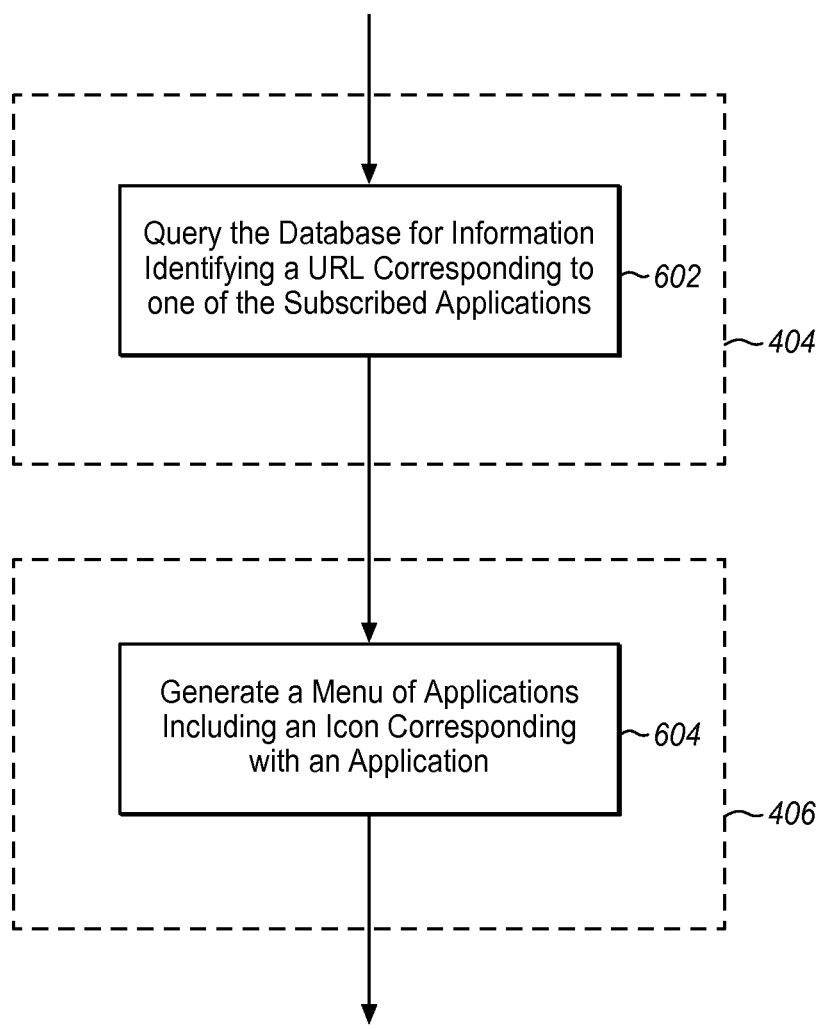

FIG. 7

Application Management Platform

MyPortal | Marketplace | Subscription         Profile | About | Help | Logout

Locale [English ▼]
Theme [Default ▼]

| User ID | | Data |
|---|---|---|
| Admin | | Admin |
| Admin | | Admin |
| User | | User |
| User1 | | User |
| Admin2 | | Admin |
| Admin3 | | Admin |
| Admin1 | | Admin |
| User4 | | User |
| Admin5 | | Admin |
| Admin5 | | Admin |
| 1Admin1 | | Admin |
| 1User1 | | User |
| 3User4 | First Last | User |
| 4Admin5 | admin5 | Admin |

Revoke User Right dialog (702):

| Personal Info | Revoke User Right |

| Application Logo | Application Name | Pricing Type | Revoke |
|---|---|---|---|
| | CloudScan | QUARTERLY | ☐ |
| | Evernote | TRANSACTION | ☐ |
| | GoogleDocs | TRANSACTION | ☐ |
| | PicasaScan | ANNUALLY | ☐ |
| | ScribdScan | ANNUALLY | ☐ |
| | SoonrFX | TRANSACTION | ☐ |
| | Twitter | TRANSACTION | ☐ |

[Reset] [Apply] [Cancel]

Inactive
Inactive

METHODS AND APPARATUS FOR PRESENTATION OF SOFTWARE AS A SERVICE APPLICATIONS

RELATED PATENTS

This patent application is a continuation of U.S. patent application Ser. No. 12/817,051 filed on Jun. 16, 2010 entitled METHODS AND APPARATUS FOR PRESENTATION OF SOFTWARE AS A SERVICE APPLICATIONS. which is hereby incorporated by reference.

BACKGROUND

1. Field of the Invention

The invention relates generally to enterprises using networked applications and more specifically relates to methods and apparatus for flexible presentation of Software As A Service (SAAS) applications to a user of a client device, such as a multi-function device (e.g., a multi-function printer, scanner, copier device).

2. Discussion of Related Art

A number of software vendors provide their software products as a service that may be accessed via a network connection between a client system and a server system. The server system provides the application software to one or more client systems accessing the server through an intermediate network (e.g., the Internet or an enterprise intranet). In general, a client system cooperates with a server system providing desired application software as a service.

Recent developments by Lexmark Corporation have extended the concept of software as a service to multi-function devices coupled to a server system through an intermediate network. As used herein, a multi-function device refers to any device that provides a combination of printing, scanning, and/or copying functions and typically includes some form of user interface integral within the multi-function device for interacting with a user of the device. Multi-function devices are also frequently referred to as multi-function printers or simply MFP's.

Lexmark Corporation recently announced a feature for some of its MFP product family referred to as "Smart Solutions." In the Smart Solutions environment defined by Lexmark, each Lexmark Smart Solutions compliant MFP device may be configured to subscribe to any of a plurality of SAAS applications available on a centralized Lexmark server. The central server of the Lexmark Smart Solutions architecture controls what SAAS applications are available to a compliant MFP and how they are presented on the client device, regardless of user or administrator preferences. Further, the presentation options of the SAAS applications on the compliant MFP using the Lexmark system are limited.

Thus, it is an ongoing challenge to provide flexibility in the presentation of SAAS applications to users of a client device.

SUMMARY

The present invention solves the above and other problems, thereby advancing the state of the useful arts, by providing methods and apparatus for flexible presentation of Software As A Service (SAAS) applications on client devices. A management system receives presentation layout information for subscribed SAAS applications from users and administrators, generates a menu of subscribed SAAS applications for presentation to a user on a display of the client device, and transmits the menu to a client device for presentation to the user. The management system may also provide for user/administrator customization of the menu of applications, and for revocation of applications available to the user by an administrator of the management system.

One aspect hereof provides a method operable in a computing system for presenting SAAS applications. Another aspect provides a computer readable medium embodying the method. The method comprises receiving, in the computing system, a presentation request from a user of a client device for a menu of subscribed SAAS applications for presentation to the user on a display of the client device. The method further comprises querying, by the computing system, a database associated with the computing system based on the presentation request for information identifying the subscribed SAAS applications and a presentation layout of the subscribed SAAS applications on the display of the client device. The method further comprises generating, by the computing system, a menu of SAAS applications based on the subscribed SAAS applications and based on the presentation layout of the subscribed SAAS applications on the display of the client device. The method further comprises transmitting the menu of SAAS applications from the computing system to the client device for presentation to the user on the display of the client device.

Another aspect hereof provides a software application management computing system. The system comprises a presentation layout interface, a menu generator, and a storage device. The menu generator is operable to receive a presentation request from a user of a client device for a menu of subscribed SAAS applications for presentation to the user on a display of the client device. The storage device stores a database. The database is operable to record SAAS application information and presentation layout information for a menu of applications. The menu generator is further operable to query the database based on the presentation request for information identifying the subscribed SAAS applications and a presentation layout of the subscribed SAAS applications on the display of the client device, further operable to generate a menu of SAAS applications based on the subscribed SAAS applications and the presentation layout of the subscribed SAAS applications on the display of the client device, and further operable to transmit the menu of SAAS applications to the client device for presentation to the user on the display of the client device.

BRIEF DESCRIPTION OF THE DRAWINGS

The same reference number represents the same element or same type of element on all drawings.

FIG. 6 is a flow chart describing exemplary additional details of the method of FIG. 4.

FIG. 7 is an exemplary screen display for allowing an administrator to revoke SAAS applications available to a user of the client device.

DETAILED DESCRIPTION OF THE DRAWINGS

FIGS. 1 through 9 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
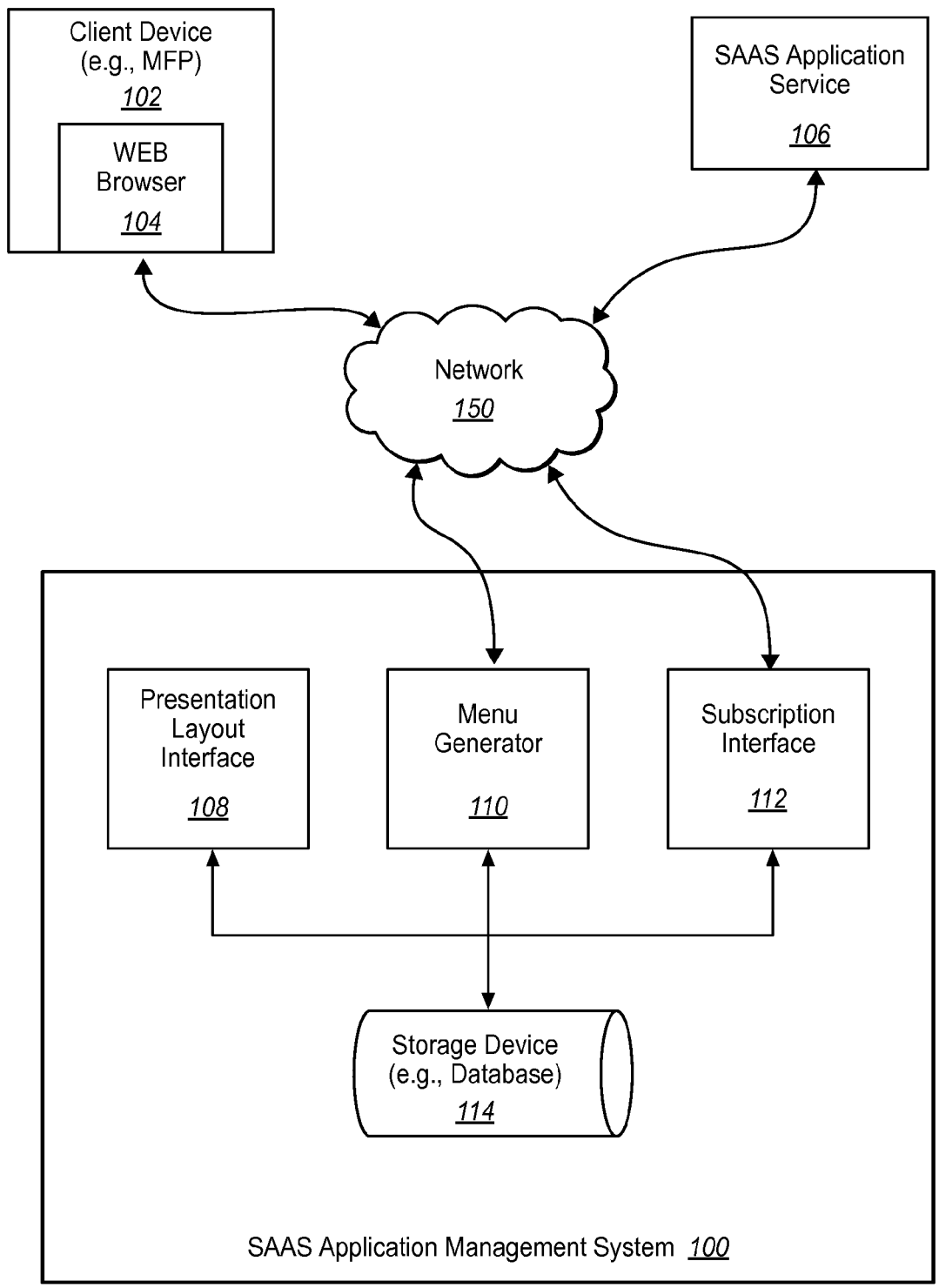
FIG. 1 is a block diagram of an exemplary software application management system in accordance with features and aspects hereof for providing flexible presentations of SAAS applications to a user of a client device.

FIG. 1 is a block diagram of an exemplary SAAS application management system 100 enhanced in accordance with features and aspects hereof for providing flexible presentations of SAAS applications to a user of a client device 102. System 100 may be any suitable computing device capable of coupling with a network 150 to exchange application information with a SAAS application service 106, to exchange subscription information with a client device 102, and to transmit menus of SAAS applications to a display on client device 102. System 100 includes a menu generator 110 for exchanging information with client device 102 via network 150, such as a menu of SAAS applications subscribed by a user of client device 102. In addition, system 100 also includes a presentation layout interface 108 for managing the presentation of the applications on client device 102. A subscription interface of system 100 allows a user to add, modify, delete, or revoke specific applications subscribed to by a user of client device 102. Network 150 may be any suitable network connection including, for example, appropriate coupling to the Internet, or coupling to an enterprise's intranet. Further, there can be any number of SAAS application services 106 coupled to system 100 through network 150. In like manner, any number of client devices 102 may be coupled to system 100 through network 150.

Client device 102 may be any device adapted for utilizing and displaying SAAS applications provided by the SAAS application service 106. In particular, client device 102 may be a multi-function device (often referred to as a multi-function printer or MFP) including a display. SAAS application service 106 may be any suitable computing device that provides one or more software applications as a service for use by one or more client devices 102. In general, client device 102 and SAAS application service 106 communicate directly through network 150 (or other suitable communication media) performing the functions of a particular SAAS application program. Client device 102 allows a user to enter logon information and retrieve a menu of subscribed SAAS applications for presentation on client device 102 (i.e., for presentation within a web browser 104 of client device 102). In addition, presentation layout interface 108 allows a user of client device 102 to modify the presentation of the menu of SAAS applications for display on client device 102 and to store the presentation in a database of storage device 114. For example, a user of client device 102 may logon using a display of client device 102. Menu generator 110 may then exchange information with client device 102 during the logon process, and receive a presentation request for a menu of SAAS applications subscribed by the user for presentation on a display of client device 102. Subscription interface 112 may then utilize the user logon information to retrieve information (i.e., by performing a query of the database in storage device 114) about specific SAAS applications subscribed to by the user, and a presentation layout for the subscribed SAAS applications. Menu generator 110 may then utilize the SAAS application information and the presentation layout of the subscribed SAAS applications to generate a menu of SAAS applications for display on client device 102, and to transmit the menu to client device 102 for display to the user.

Presentation layout interface 108 allows the user of client device 102 to modify the presentation layout of the menu of subscribed SAAS applications for display on client device 102. The user may, for example, organize the SAAS applications in the menu as desired for readability and ease of use as the user sees fit. Such organization may allow the user to include more frequently utilized SAAS applications on the first page of multiple pages of menus displayed on client device 102. Thus, the user of client device 102 is afforded flexibility and customization for how SAAS applications are presented on client device 102.

Presentation layout interface 108 also allows an administrator of system 100 to define a presentation layout for SAAS applications subscribed by a user of client device 102 on an organizational basis. For example, a user of client device 102 may also logon to client device 102 using organizational information, such as specific departments or buildings (e.g., engineering department, marketing department, building 5, etc.). An administrator may utilize presentation layout interface 108 to provide organizationally based subscriptions to applications and a presentation layout of such subscriptions. An administrator may decide, for example, that all users which are part of the marketing group will be presented with a specific set of subscribed SAAS applications on client device 102, which may then utilize a common presentation layout defined by the administrator. Menu generator 110 may then utilize the organizational information to generate the specific menu of SAAS applications for the user of client device 102 based on the information provided by the user during logon.

Generally, presentation layout interface 108 operates in different ways based on the authentication of the user. For example, a non-administrative user may logon to system 100 using a computer and interface with presentation layout interface 108 for modifying or customizing a menu of applications for presentation on client device 102 based on the specific user logged into system 100. An administrator user, in contrast, may logon to system 100 for modifying or customizing a menu of applications for presentation on client device 102 based on a number or group of users. In addition, presentation layout interface 108 allows an administrator to revoke selective applications previously subscribed to by users or organizational users. For example, an administrator may decide not to allow a specific application to be used by a specific user or groups of users, for various reasons such a cost associated with use of the application, a decision to utilize a replacement application instead of the revoked application, etc. Such revocation information may be stored in the database of storage device 114, and utilized by menu generator 110 when generating menus of applications for users and groups of users.

Figure 2:
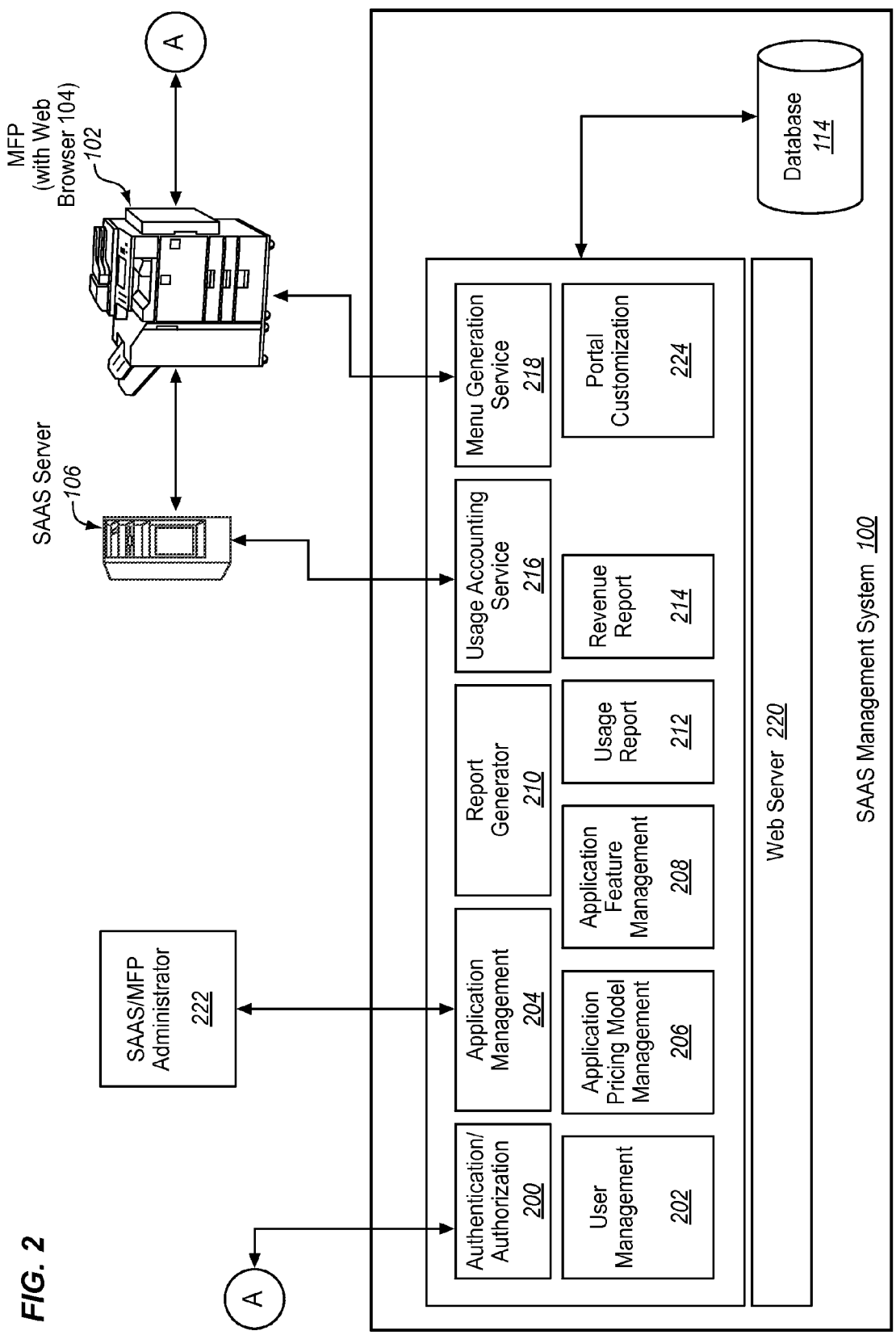
FIG. 2 is a block diagram of another exemplary software application management system in accordance with features and aspects hereof for providing flexible presentations of SAAS applications to a user of a client device.

FIG. 2 is a block diagram depicting another exemplary embodiment of a SAAS management system providing additional details of an exemplary modular decomposition within system 100. As discussed above with respect to FIG. 1, system 100 may be coupled with an application service 106 and MFP 102 (which, in turn, includes a web browser 104). Also, the coupling of system 100 to application service 106 and/or MFP 102 may utilize any suitable connectivity including, for example, Internet connectivity.

Figure 3:
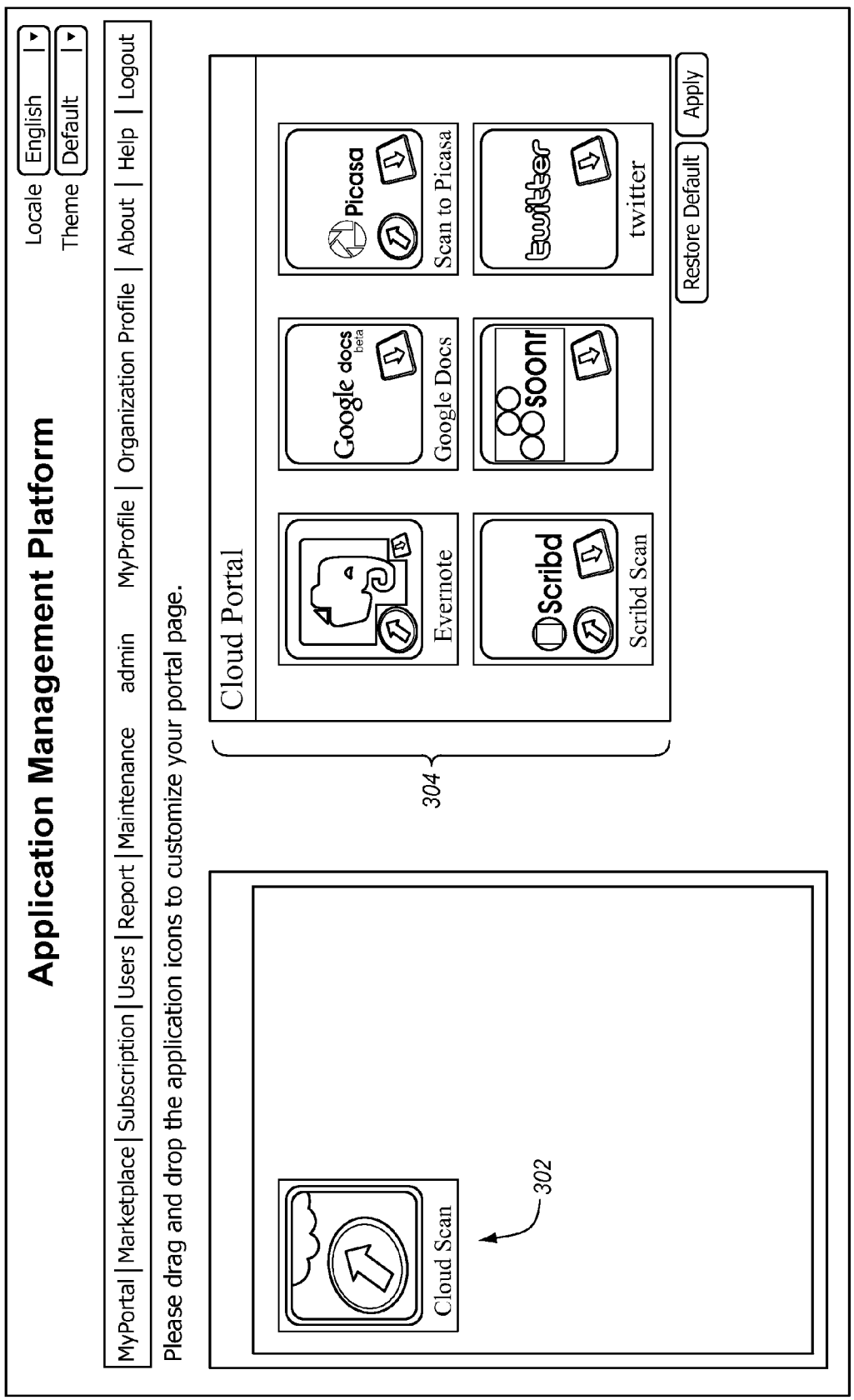
FIG. 3 is an exemplary screen display for allowing a user or an administrator to modify the presentation of SAAS applications on the display of a client device.

A portal customization module 224 allows authenticated users and/or administrators to customize the presentation of a menu of SAAS applications presented to MFP 102. For example, a user/administrator may logon to system 100 using a remote computer (not shown) executing a web browser to customize the presentation of a menu of SAAS applications to be presented on MFP 102. One such example of a web page for customizing the presentation of a menu of SAAS applications is shown in FIG. 3, which is an exemplary screen display for allowing a user/administrator to modify the presentation of SAAS applications, as they would be shown on the display of MFP 102. In FIG. 3, a user/administrator may drag and drop icons 304 representing subscribed SAAS applications (i.e., provided by a SAAS server 106) for customizing the presentation layout of the menu of applications 302 on MFP 102. Such customized presentation layout may include, for example, arranging one or more icons 304 for display by MFP 102, organizing icons 304 such that a preferred set of icons 304 are presented on a first page of multiple pages of icons 304, etc. Such a customized presentation layout may then be stored in database 116 for later retrieval when a presentation request is received by system 100 from MFP 102 for a menu of applications for display on MFP 102.

System 100 may also be coupled with a SAAS/MFP administrator 222 utilizing any suitable connectivity with an administrative user. An authentication/authorization module 200 provides for secure login for the administrative user 222. In addition, authentication/authorization module 200 may provide secure login capabilities to authenticate a user of MFP 102 interacting through a computer system coupled with system 100. Once authenticated through authorization/authentication module 200, administrative user 222 may perform user management functions utilizing user management module 202 to create and modify menus of SAAS applications for organizational users of MFP 102. Users may authenticate through module 200 with the computer system to gain access to system 100 for purposes of subscribing to available SAAS applications and modifying the presentation of SAAS applications on MFP 102. An authenticated administrative user 222 may also utilize application management module 204 to interact with application pricing model management module 206 and application feature management module 208. Application pricing model management module 206 allows the administrative user to create a pricing model to be associated with a particular application. For example, an administrative user may set a particular price for a user wishing to subscribe to a particular SAAS application. In like manner, application feature management module 208 may be utilized by an authenticated administrative user through application management module 204 to define how usage of a subscribed application is to be monitored and recorded. For example, a subscribed application may be monitored on a per-use basis, a time basis, etc. The user information defined through user management module 202, pricing model information defined through application pricing model management module 206, and application features defined by application feature management module 208 may all be stored in database 116 for use by other modules within system 100, for example, when generating reports.

An authenticated administrative user 222 or an authenticated user of MFP 102 may interact through a report generator 210 to generate a usage report utilizing usage report module 212 and/or a revenue report utilizing revenue report module 214. Usage report module 212 and revenue report module 214 retrieve information from database 116 to generate and return a requested report from report generator 210 to a requesting administrative user 222 or user of MFP 102.

Menu generation service 218 utilizes information in database 116 regarding applications available through system 100. Based on authentication/authorization information obtained through module 200, menu generation service 218 provides a menu of available SAAS applications for a particular identified user or for a particular group of users of MFP 102. The menu generated by menu generation service 218 may include a menu of all available SAAS applications when so requested and/or may include a menu of only those applications presently subscribed to by the authenticated user and/or group ID received during logon. These and other menus may be generated based on information stored in database 116 and provided to MFP 102 in response to a request from a user of MFP 102.

Usage accounting service 216 receives usage information from SAAS application service 106 indicating tracked units of usage detected by service 106 in providing the application for use by MFP 102. Usage accounting information received from SAAS service 106 may include, for example, identification of the particular application, identification of the particular unit of usage, identification of the particular client device (e.g., MFP 102 as identified by its IP address or other suitable indicia), identification of a particular user and/or group of users generating the particular usage report usage information, etc.

Exemplary details of the information exchanged between system 100, administrative user 222, and SAAS server 106 or between system 100 and MFP 102 are discussed further herein below. Numerous additional and equivalent modules may be present in a particular embodiment of system 100. Further, fewer or more modules may be defined within system 100 in any particular modular decomposition of exemplary embodiments as a matter of design choice. Thus, the systems of FIGS. 1 and 2 are intended merely as exemplary of possible embodiments in accordance with features and aspects hereof.

Figure 4:
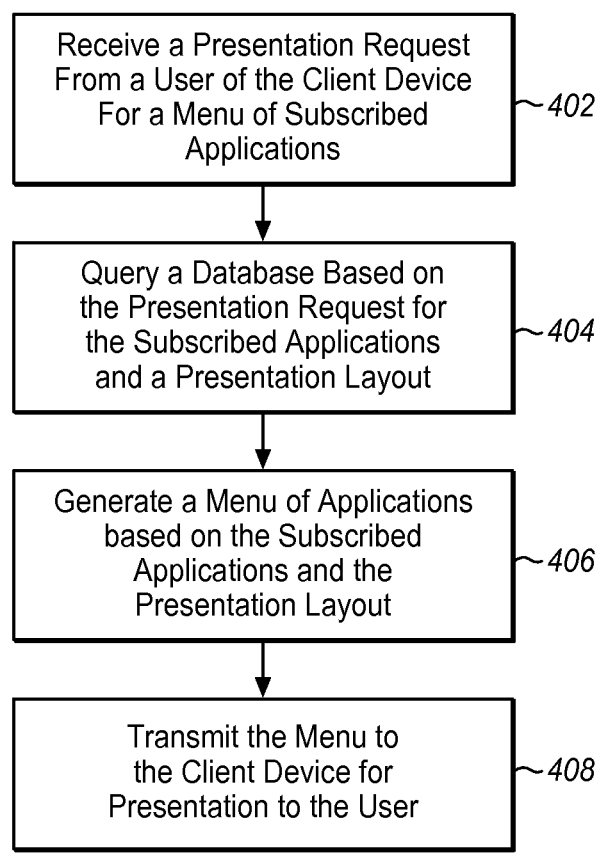
FIG. 4 is a flow chart describing an exemplary method for providing flexible presentations of SAAS applications to a user of a client device.

FIG. 4 is a flowchart describing an exemplary method operable in system 100 of FIGS. 1 and 2 for providing flexible presentations of SAAS applications to a user of a client device. In general, the system is responsive to exchanges with client devices and/or application services as well as administrative users configuring the system. The various requests and responses may be encoded in any suitable protocols including, for example, HTML pages communicated utilizing HyperText Transfer Protocol HTTP exchanges.

Step 402 of FIG. 4 comprises receiving a presentation request in the system from a user of a client device for a menu of subscribed SAAS applications. The presentation request may include information identifying a particular user, a particular organization the user belongs to, information identifying the specific client device, or any combination thereof. A user may, for example, approach a client device and securely logon to the client device using a user name and a password. The client device may then perform a query (e.g., of an authorization server coupled with the client device or the system) to authenticate the user. In addition, the client device may identify a particular organizational group that the user belongs to, such as the engineering department, the marketing department, etc. The client device may then format and transmit a presentation request to the system for a menu of applications associated with the particular user or organizational group that the user belongs to. In some embodiments, the presentation request may include information specifically identifying the client device. The client device information may then allow the system to format a menu of applications based on the type of display found on the client device (i.e., based on the size and/or resolution of the display), and the number and type of user inputs available on the client device (i.e., the number of available buttons, the presence of a mouse, etc.).

Step 404 comprises the system querying a database based on the presentation request for subscribed applications and a presentation layout of the applications. For example, the query may include retrieving records in the database identifying specific applications associated with the user/organizational group that the user belongs to. Such records may include an icon associated with an application, and a Uniform Resource Locator (URL) corresponding with the application. The URL may identify a specific network address or location (e.g., an IP address) of the application for execution, such as on a remote server on the internet, a computing system within a local network that includes the system, etc. The records may also include a specific presentation of the icons of the applications to be displayed on the client device, such as a size of the icons, a placement of the icons relative to each other, on which page the icons are found (when a menu of applications includes multiple pages), etc. Such records may also include menus based on a user and on the organizational group of the user. In some cases, presentation of the menu based on the organizational group of the user may supersede the user menu, such as when an administrator wishes to generate a common menu for a particular group of users.

Step 406 comprises generating a menu of applications by the system based on the subscribed applications and the presentation layout. As discussed previously, generating the menu may include some modifications to the menu based on the capabilities of the client device for display and user input. The menu may be generated in a specific format recognized by the client device, such as in XML, HTML, etc.

Figure 5:
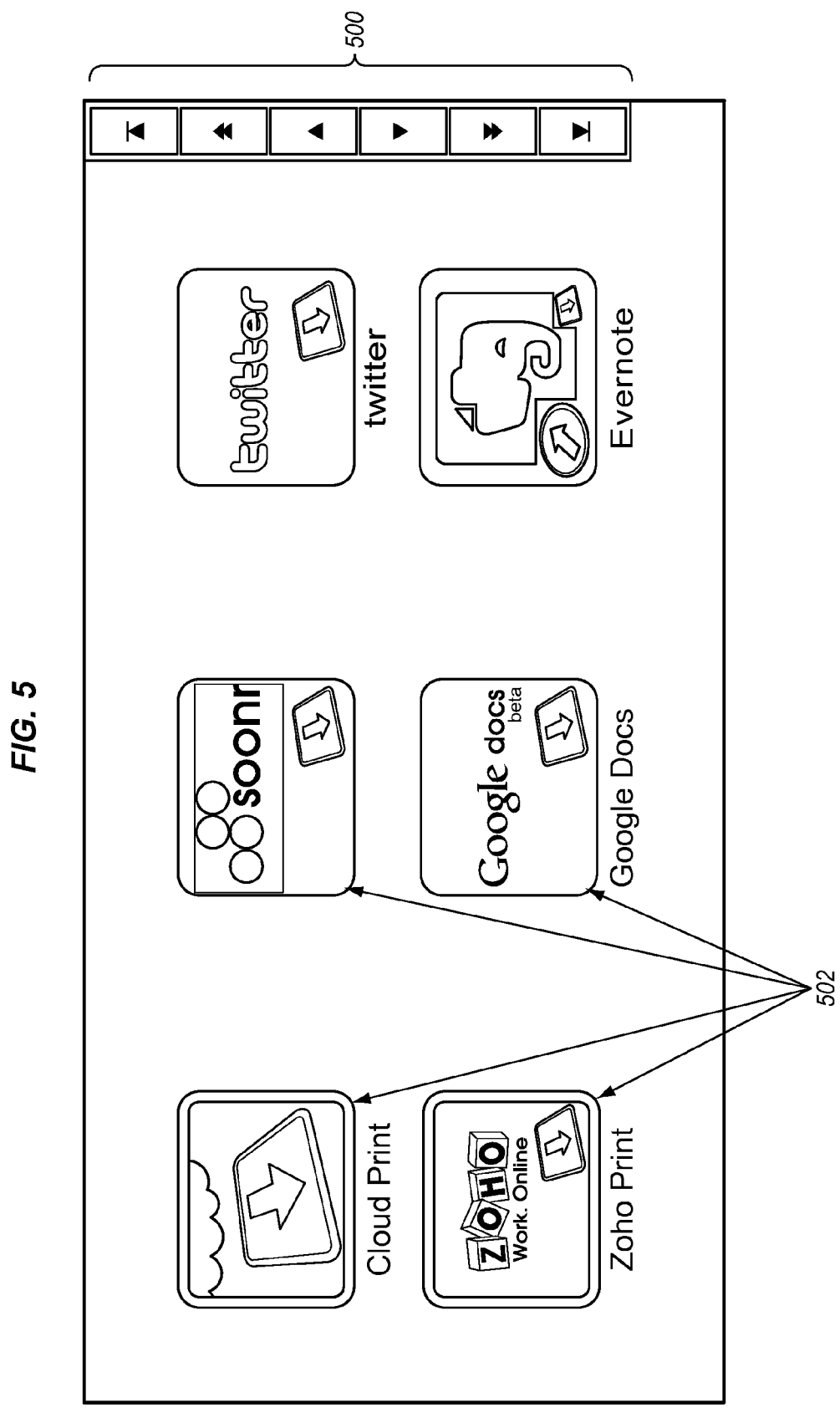
FIG. 5 is an exemplary screen display for a menu of SAAS applications that may be accessed by a user of a client device.

Step 408 comprises transmitting the menu from the system to the client device for presentation to the user on a display of the client device. Transmitting the menu may include communicating with various local and remote networks coupled with the system, such as when the client device is located remotely and accessible through the Internet. FIG. 5 is an exemplary screen display for a menu of SAAS applications that may be accessed by the user of a client device. FIG. 5 illustrates various application icons 502, which may be arranged in a specific presentation layout based on the user/administrative customizations of the menu, based on the specific display available on the client device, etc. The menu of applications may be accessed by the user of the client device in a number of ways, including utilizing a touch screen on the client device for selecting various applications, utilizing buttons on the client device, etc. When a user selects a particular application for inclusion in the menu, a URL may be associated with the application that then indicates to the client device a network location for accessing the application.

FIG. 6 is a flowchart describing exemplary additional details of the method of FIG. 4. Step 602 comprises querying the database for information identifying a URL corresponding to one of the subscribed applications. As described previously, an application may be executed remotely from the client device (i.e., the software is provided as a service by another computing system external to the client device). A URL for the application may then identify a network address of the remote computing device for accessing the application. For example, the URL may identify a network address for remotely executing the application on a server residing on the Internet. Thus, when step 404 of FIG. 4 performs a query of the database for information regarding subscribed applications, the query may also request the URL information corresponding to an application subscribed to by a user/group of users.

Step 604 comprises generating a menu of applications including an icon for the application and associating the URL with the application. Thus, when step 406 of FIG. 4 generates a menu of applications for the client device, the menu may also include the icon and the URL identified in step 602. When a user interacts with the menu on a client device, such as by selecting a particular icon, the URL may be utilized by the client device for accessing the application.

In some cases, an administrator for the system may wish to revoke specific applications previously subscribed to by a particular user of a client device. For example, perhaps an organization no longer wishes to allow users or organizational groups to have access to a particular application on a client device. In these cases, the system also provides mechanisms for administrators to selectively revoke previously subscribed applications by users/groups of users. For example, an administrator of the system may interact with a screen display similar to that shown in FIG. 7 for revoking applications 702 available to a specific user or a specific group of users of the client device. Such revocation information may then be recorded in the database and utilized by the system when responding to subsequent presentation requests by the client device.

Figure 8:
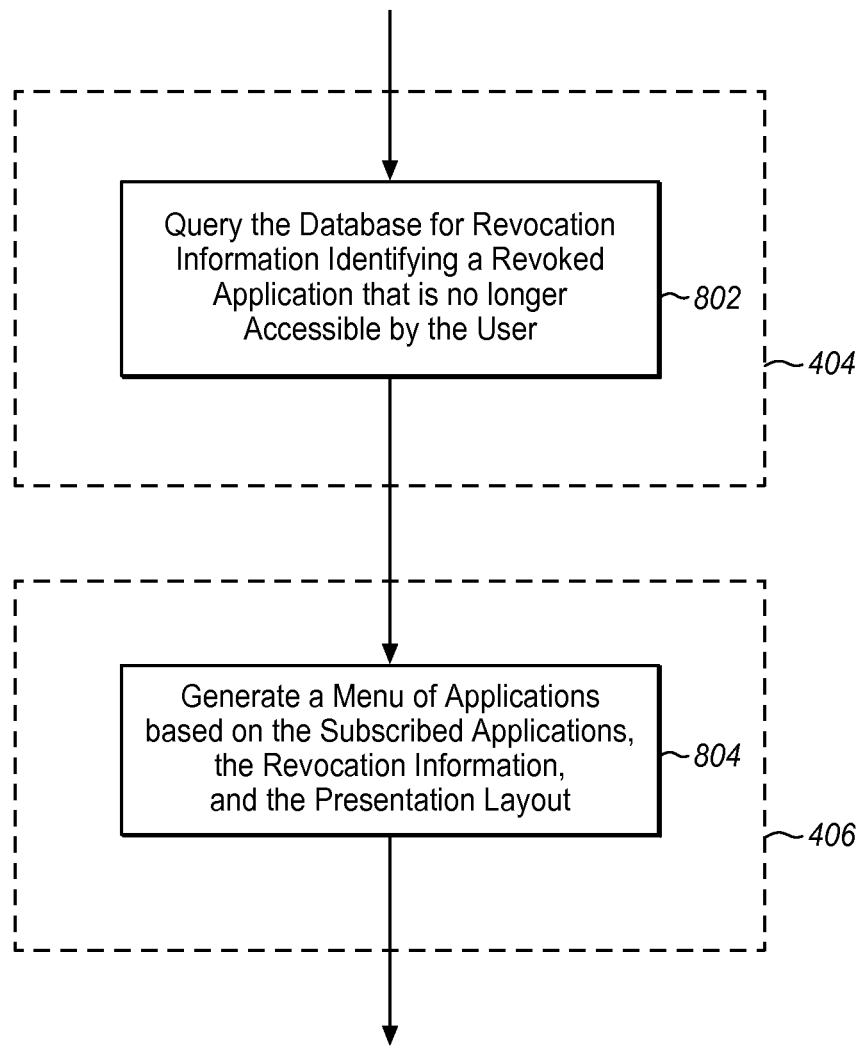
FIG. 8 is a flow chart describing exemplary additional details of the method of FIG. 4.

FIG. 8 is a flow chart describing exemplary additional details of the method of FIG. 4. Step 802 of FIG. 8 comprises querying the database for revocation information identifying a revoked application that is no longer accessible by the user. As discussed previously with regard to the method of FIG. 4, a presentation request is received by the system for a menu of subscribed applications for display on the client device. In step 404 of FIG. 4, a query was performed of the database by the system for the subscribed applications. In step 802 of FIG. 8, which provides additional details to the query, revocation information is also retrieved from the database. For example, the revocation information may be associated with a particular user, organizational group of users, etc. Such revocation information may specifically identify that a particular user may no longer have access to a previously subscribed application, such as when the user no longer has a specific job responsibility that necessitated access to the application. In addition, the revocation information may identify an organizational group or groups of users that may no longer have access to an application, such as when the accounting department no longer needs access to various accounting applications during an audit.

Step 804 comprises generating a menu of applications based on the subscribed applications, the revocation information, and the presentation layout. As discussed previously with regard to the method of FIG. 4, a menu of applications is generated by the system in step 406. In step 804, which provides additional details to the menu generation, the revocation information from the database is also considered when generating the menu. For example, the menu may be generated to not include the revoked applications, or may indicate a revocation status, such as by including an "X" across an icon or name of an application in the menu, graying out the application name or icon, etc. In some cases, the presentation layout may be modified based on the revocation information.

For example, some application icons may move position within a page of the menu when revoked applications are no longer present in the menu. Those of ordinary skill in the art will readily recognize numerous additional and equivalent steps in the methods of FIG. 4, FIG. 6, and FIG. 8. Such additional and equivalent steps are omitted herein for simplicity and brevity of this discussion.

Figure 9:
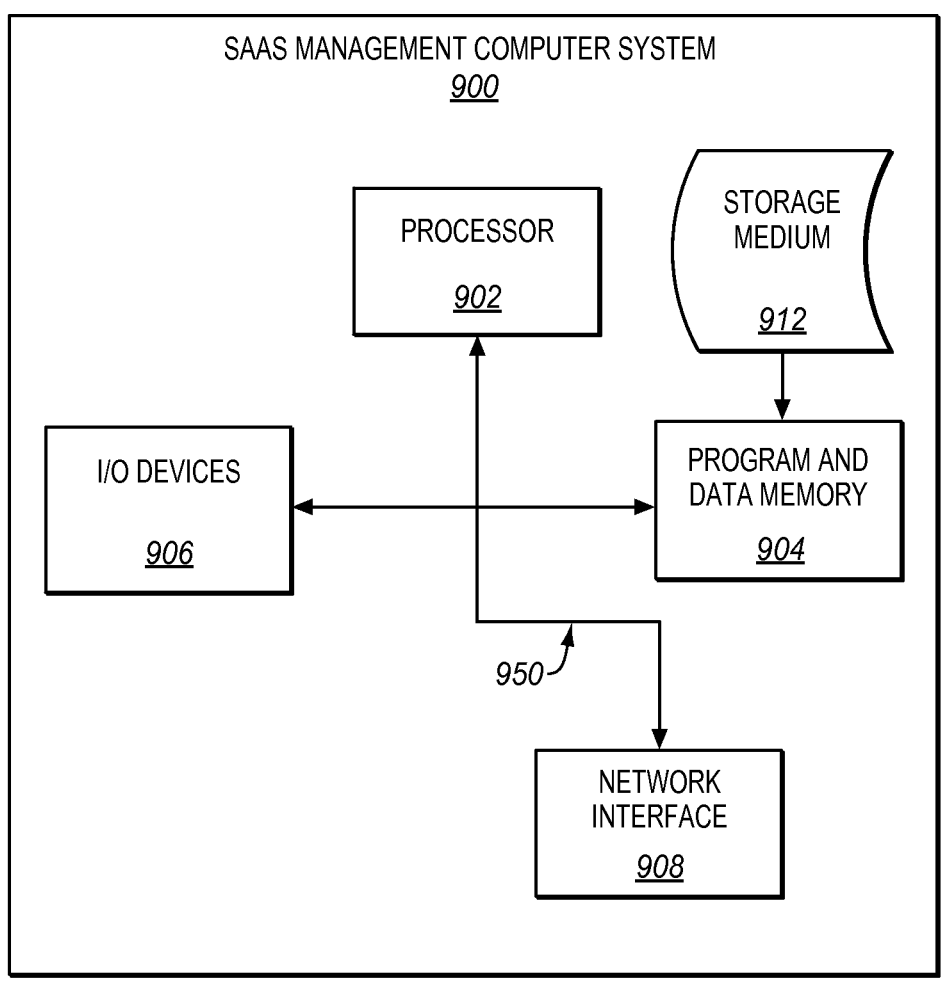
FIG. 9 is a block diagram of a software application management computing system on which a computer readable medium may be used to receive program instructions for a method to provide flexible presentations of SAAS applications to a user of a client device.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 9 is a block diagram depicting a SAAS management computer system 900 adapted to provide features and aspects hereof by executing programmed instructions and accessing data stored on a computer readable storage medium 912 for implementing one or more of the methods of FIGS. 4, 6, and 8 depicted herein.

Furthermore, embodiments of the invention can take the form of a computer program product accessible from a computer-usable or computer-readable medium 912 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A SAAS management computer system 900 suitable for storing and/or executing program code will include at least one processor 902 coupled directly or indirectly to memory elements 904 through a system bus 950. The memory elements 904 can include local memory employed during actual execution of the program code, bulk storage, and cache memories, which provide temporary storage of at least some program code in order to reduce the number of times code must be retrieved from bulk storage during execution.

Input/output or I/O devices 906 (including but not limited to keyboards, displays, pointing devices, etc) can be coupled to the system either directly or through intervening I/O controllers. Network adapter interfaces 908 may also be coupled to the system to enable the SAAS management computer system 900 to be coupled with other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A method operable in a computing system for presenting Software As A Service (SAAS) applications to a Multi-Function Printer (MFP), the method comprising:

receiving, in the computing system, a presentation request from a user of the MFP for a menu of subscribed SAAS applications for presentation to the user on a display of the MFP;

querying, by the computing system, a database associated with the computing system based on the presentation request for information identifying the subscribed SAAS applications and revocation information identifying a revoked SAAS application that is no longer accessible by the user of the MFP;

generating, by the computing system, a menu of SAAS applications based on the subscribed SAAS applications and the revocation information, wherein that the revoked SAAS application is no longer accessible by the user of the MFP in the menu utilizing a revocation status indication for the revoked SAAS application comprising a change in position on the presentation layout for the icon; and transmitting the menu of SAAS applications from the computing system to the MFP for presentation to the user on the display of the MFP.

2. The method of claim 1 further comprising:

receiving, by the computing system, a presentation layout for a placement of an icon corresponding with a SAAS application within the menu of SAAS applications; and generating, by the computing system, the menu of SAAS applications based on the presentation layout.

3. The method of claim 1 wherein:

the step of querying further comprises:
    querying the database for information identifying at least one Uniform Resource Locator (URL) corresponding a subscribed SAAS application; and the step of generating further comprises:
    generating the menu of SAAS applications including an icon corresponding with the at least one URL.

4. The method of claim 1 further comprising:

receiving, in the computing system, revocation information identifying the revoked SAAS application of the subscribed SAAS applications that is no longer accessible by the user of the MFP; and recording, by operation of the computing system, the revocation information in the database.

5. The method of claim 1 wherein:

the presentation request includes at least one of a user identification for the user and an organization identification for the user; and the step of querying the database further comprises:
    querying the database for subscription information identifying SAAS applications subscribed by the user of the MFP based on at least one of the user identification and the organization identification.

6. The method of claim 1 wherein:

the presentation request includes an identification of the MFP;

the step of querying further comprises:
    querying the database for presentation capabilities of the MFP based on the identification of the MFP, wherein the presentation capabilities include at least one of a screen resolution of the display on the MFP, a size of the display on the MFP, and a user input available on the MFP; and the step of generating further comprises:
    generating the menu of SAAS applications based on the presentation capabilities of the MFP.

7. A non-transitory computer readable medium embodying programmed instructions that, when executed by a processor, direct the processor to:

receive a presentation request from a user of a MFP for a menu of subscribed SAAS applications for presentation to the user on a display of the MFP;

query a database based on the presentation request for information identifying the subscribed SAAS applications and revocation information identifying a revoked SAAS application that is no longer accessible by the user of the MFP;

generate a menu of SAAS applications based on the subscribed SAAS applications and the revocation information, wherein the revoked SAAS application is no longer accessible to the user of the MFP in the menu utilizing a revocation status indication for the revoked SAAS application comprising a change in position on the presentation layout for the icon; and transmit the menu of SAAS applications to the MFP for presentation to the user on the display of the MFP.

8. The non-transitory computer readable medium of claim 7 wherein the instructions further direct the processor to:

receive revocation information identifying a revoked SAAS application of the subscribed SAAS applications that is no longer accessible by the user of the MFP; and recording the revocation information in the database.

9. The non-transitory computer readable medium of claim 7 wherein the instructions further direct the processor to:

receive a presentation layout for a placement of an icon corresponding with a SAAS application within the menu of SAAS applications; and generate the menu of SAAS applications based on the presentation layout.

10. The non-transitory computer readable medium of claim 7 wherein:

the presentation request includes at least one of a user identification for the user and an organization identification for the user; and instructions directing the processor to query the database further comprise instructions to:

query the database for subscription information identifying SAAS applications subscribed by the user of the MFP based on at least one of the user identification and the organization identification.

11. The non-transitory computer readable medium of claim 7 wherein:

the presentation request includes an identification of the MFP;

instructions directing the processor to query the database further comprise instructions to:

query the database for presentation capabilities of the MFP based on the identification of the MFP, wherein the presentation capabilities include at least one of a screen resolution of the display on the MFP, a size of the display on the MFP, and user inputs available on the MFP; and instructions directing the processor to generate the menu further comprise instructions to:

generate the menu of SAAS applications based on the presentation capabilities of the MFP.

* * * * *